United States Patent [19]

Lew et al.

[11] Patent Number: 4,880,646

[45] Date of Patent: Nov. 14, 1989

[54] ENCAPSULATED CORN KERNELS AND METHOD OF FORMING THE SAME

[75] Inventors: Chel W. Lew; Darren E. Barlow, both of San Antonio, Tex.

[73] Assignee: Southwest Research Institute, San Antonio, Tex.

[21] Appl. No.: 277,296

[22] Filed: Nov. 29, 1988

[51] Int. Cl.$^4$ .............................................. H23L 1/36
[52] U.S. Cl. ..................................... 426/93; 426/113; 426/303; 426/307; 426/309
[58] Field of Search .................. 426/93, 303, 307, 309

[56] References Cited

U.S. PATENT DOCUMENTS

| | | |
|---|---|---|
| 4,562,663 | 1/1986 | Redenbaugh et al. . |
| 4,571,337 | 2/1986 | Cage et al. ........................... 426/107 |
| 4,715,143 | 12/1987 | Redenbaugh et al. . |
| 4,767,635 | 8/1988 | Merritt et al. ....................... 426/272 |

*Primary Examiner*—Donald E. Czaja
*Assistant Examiner*—Drew S. Workman
*Attorney, Agent, or Firm*—Sigalos, Levine & Montgomery

[57] ABSTRACT

Encapsulated corn kernels consisting essentially of a kernels of corn suitable for popping coated over at least a portion of the outer surface thereof with an edible oleaginous substance or edible wax and thereover with an outer shell of an edible polymer. The process of making such encapsulated kernel; and microwaveable corn products consisting essentially of the encapsulated corn kernels in a microwaveable package.

10 Claims, No Drawings

ENCAPSULATED CORN KERNELS AND METHOD OF FORMING THE SAME

BACKGROUND OF INVENTION

This invention relates to the encapsulation of corn, which is to be popped (popping corn) and the method of forming the same in an economic manner.

Corn for popping purposes has been utilized for many years and recently there has come into vogue microwaveable popcorn. This requires for suitable popping, the packaging of the corn kernels in laminated bags which are placed into a microwave oven and the corn popped therein.

It has been found that this packaging is both limiting and expensive. The amount of corn to be popped is regulated by that already bagged. As to expense, in order to prevent leakage of oil or condiments from the package during storage and shipment prior to use and during popping, several layers of specialized layers of film (such as specially coated paper) must be laminated together to form the packaging.

It is also been desired to be able to pop the corn more quickly whether in a microwave oven and by use of other conventional corn popping methods and to ensure popping of all of the kernels. Failure of kernels to pop is a general problem associated with popping corn and is often particularly aggravated with "older" popcorn in which the moisture content of the kernel is lower than that of the corn originally. Popping of popcorn is accomplished when the kernels are heated and the moisture inside is turned to steam which builds up pressure to a point where it is sufficient to rupture the tough outer coat of the kernels and the entire inside of the kernels puffs out. If the moisture content of the kernels is too low they will not pop due to the fact that sufficient steam pressure cannot be developed by heating.

It is known to use oleaginous materials such as oils and butter for the popping of corn kernels since they will result in more rapid popping and a larger number of kernels popped. The reason for these is that by coating the kernels they aid in obtaining higher temperatures resulting in the popping of a larger number of kernels; unless, again, the corn is too old or has too low a moisture content.

In the mircowave packaging presently used one of the efforts to use oils involves placing such oils on the interior layer of the packaging material which acts to supply the popping oil. However, as noted, this requires the use of expensive packaging which greatly increases the cost of the thus packaged corn.

Efforts to overcome these problems of poor popping in all popcorn and costly packaging for microwave popcorn have not been successful.

SUMMARY OF THE INVENTION

The present invention provides novel encapsulated corn kernels which overcome the problems of the prior art and also a method of making the same which is economic.

Briefly stated, the present invention comprises encapsulated kernels of corn consisting essentially of kernels of corn suitable for popping coated over at least a portion of the outer surface thereof with an edible oleaginous substance or wax and thereover an external shell selected from an edible polymer. The invention also comprises a novel microwaveable corn product and the method of making such encapsulated corn is set forth below.

DETAILED DESCRIPTION

In the present invention any corn suitable for making popcorn can be used. As is known, not all corn is not suitable for popping, and unsuitable varieties will only crack and parch when heated instead of popping. Some suitable varieties are Pod, Flint, and Dent, but any variety of corn used for making popcorn can be utilized.

The initial step of making the encapsulated kernels is to coat the popcorn kernels; preferably the entire outer surface with an edible oleaginous substance or wax. Such coating is also preferably of a substantially uniform thickness. It is preferred to use a material which has a melting point about 100° F. and above. Examples of suitable oleaginous materials are low melting points fats, partially hydrogenated oils, combinations thereof and the like, and as to the waxes, mineral waxes such as paraffins, or natural waxes such as beeswax or the edible vegetable waxes such as carnauba and the like, and synthetic waxes such as polyethylene waxes. Of these the edible fats are preferred. This coating ca be accomplished by simply adding the kernels to the liquified oleaginous and/or waxy substance and then removing them from such fluid and permitting the coating to harden and dry at a lower temperature. The thus coated popcorn kernels are then coated with the outer shell forming material.

The outer shell forming capsular material can be any edible polymeric material; either synthetic or naturally occurring polymers, such as polyvinyl alcohol, gelatin, methyl cellulose, hydroxypropyl methylcellulose, polyethylene glycol, or an alginate, and the like. Preferred are the alginates such as calcium alginate.

In the case of certain materials, such as the alginates, it is necessary to incorporate a material capable of hardening the same. With alginates a catalytic material capable of hardening the alginate is used, examples being the calcium salts such as calcium acetate, calcium chloride, calcium hydroxide, calcium gluconate, calcium lactate and other edible multivalent cationic compounds which will cause the alginate to gel or solidify.

After the desired thickness of the capsule layer has been attained, the encapsulated corn kernels are simply removed from the solution; as by screening, rinsed, and dried. The thus encapsulated popcorn kernels can then be packaged and used in any conventional packaging material such as paper or paperboard; they do not need the special packaging of the present microwaveable popping corn. In addition they are not limited in that they can also be popped in conventional heating ovens or over open heat without any packaging.

Equally importantly, by thus encapsulating the kernels their initial moisture levels are maintained and there is therefore a greatly reduced incident of "unpopped" kernels when the encapsulated kernels are heated for popping after storage. Also, the oleaginous or waxy coatings generate the higher heat and shorten the time required to pop the corn.

The process of the instant invention is significant since it permits the mass production of the coated encapsulated kernels. In the instant method, if an alginate is used the catalyst or hardening compound is added to the initial layer about the corn kernel followed by adding the kernels to the alginate either in solution or in the form of an aqueous mist or spray. The catalyst in the inner shell then reacts with the alginate in the solution or sprayed to form the outer encapsulating layer about the corn. The procedure can be carried out either on a batch or on a continuous basis.

In the continuous basis the corn kernels are preferably put on a perforated conveyer belt which dips into a bath of the liquefied oleaginous substance or wax and carries the corn therethrough to ensure coating of all of the kernels. The traveling belt then removes the coated corn from the bath and conveys it for a time sufficient to dry the same so it ca then be placed into the solution of the encapsulating material. If an alginate encapsulating layer is to be utilized, intermediate the tank containing the oleaginous substance or wax and that containing the alginate encapsulating material, there is a zone of application of a layer the catalyst material onto the coated corn. This is preferably done in the form of a fine powder applied onto the corn having a tacky surface of oleaginous substance or wax that has not been completely dried.

The retention time of the corn in the encapsulating material is dependent upon the thickness desired of the shell and can vary widely. The thickness need only be that required to ensure that the shell does not abrade or rupture to expose the inner oleaginous or waxy layer. This will vary dependent upon the strength of the particular encapsulating material used and can be determined by routine experimentation. Excess thickness may result in an objectionable amount of outer shell residue in terms of causing undesirable taste.

As to the thickness of the inner oleaginous or waxy layer there is again no criticality as long as there is a coating of the kernels. However, the thickness should not be too great so as to give the popped corn an oily or waxy taste. Again, routine experimentation will determine the most suitable thickness for any particular oleaginous material or wax.

If desired, the oleaginous or waxy layer can also contain flavorants, such as salt, pepper, spices, flavoring oils, or combination thereof; odorants such as volatile oils to give a butter or other aroma; biocides such as edible fungicides; i.e., sodium propionate and the like, to inhibit any mold spoilage of the corn; colorants to give different colored popcorn; as well as combinations of the foregoing and other edible materials that can be added to popcorn. In the case of oleaginous materials, conventional antioxidants can be added to inhibit or prevent rancidity. If desired, some of these components can be included in the outer shell.

The invention will be further described in connection with the following example which is set forth for purposes of illustration only.

EXAMPLE

Approximately 25 parts by weight of popcorn kernels were dispersed in approximately 5 parts by weight of MELVO a low melting fat (partially hydrogenated soybean/cotton seed oil, 99°–100° F. m.p.). The slurry containing the popcorn kernels was kept at approximately 105° F. and the fat-coated popcorn kernels removed from slurry onto a bed of 50 parts by weight mixture of starch and calcium acetate to form a light coating of such mixture of the fat-coated kernels. The fat coated popcorn kernels with the coating of the catalyst were placed into a container containing approximately 300 parts by weight of a 1.5% by weight aqueous alginate (Satialgine S-20) and agitated for approximately 2 to 3 minutes. The thus encapsulated popcorn kernels with the fat inner shell and alginate outer shell were screened from the alginate solution, rinsed several times with tap water to remove the excess alginate solution, and air dried.

In order to evaluate the popping ability of the kernels they were placed in a Panasonic microwave oven model no. NE7900 (700 Watts, 1.25 cubic feet capacity). In order to make a strict evaluation, a number of batches were tested of the same corn untreated and encapsulated in accordance with the present invention with each containing the same number of popcorn kernels. Those that were not encapsulated were placed in the microwave oven with an amount of fat closely approximating that utilized to encapsulate the kernels of the instant invention. The untreated popcorn kernels did not begin to pop until 36 seconds had elapsed and the encapsulated popcorn kernels only required 20 seconds before starting to pop.

The total popping time used herein, in order to equalize the results, was to calculate when the first kernel popped and to add an additional 2 minutes. Thus, the average popping time of the untreated popcorn kernels was 2 minutes and 36 seconds and that of the encapsulated popcorn kernels of the present invention was 2 minutes and 20 seconds. Approximately equal numbers of kernels popped for the untreated as well as the encapsulated kernels.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. Encapsulated corn kernels consisting essentially of kernels of corn suitable for popping coated over at least a portion of the outer surface thereof with an edible oleaginous substance or edible wax and thereover with an outer shell of an edible polymer.

2. The encapsulated corn kernels of claim 1 wherein the edible oleaginous material is a low melting point fat, partially hydrogenated oil, or combination thereof, said edible wax is a mineral wax, natural wax, or synthetic wax and said edible polymer is a polyvinyl alcohol, gelatin, methyl cellulose, hydroxypropyl cellulose, polyethylene glycol, or alginate.

3. The encapsulated corn kernels of claim 2 wherein the kernels are substantially entirely uniformly coated with said oleaginous or waxy material.

4. The encapsulated corn kernels of claims 1, 2, or 3 wherein said outer shell is an alginate.

5. The method of encapsulating corn kernels comprising first coating at least a portion of the outer surface of said kernels with an edible oleaginous substance or edible wax and subsequently encapsulating said coated kernels with an edible polymer to form an outer shell.

6. The process of claim 5 wherein the edible oleaginous material is a low melting point fat, partially hydrogenated oil, or combination thereof, said edible wax is a mineral wax, natural wax, or synthetic wax and said edible polymer is a polyvinyl alcohol, gelatin, methyl cellulose, hydroxypropyl cellulose, polyethylene glycol, or alginate.

7. The process of claim 6 wherein the kernels are substantially entirely uniformly coated with said oleaginous or waxy material.

8. The process of claims 5, 6, or 7 wherein said outer shell is an alginate.

9. A microwaveable corn product consisting essentially of the encapsulated corn kernels of claims 1, 2, or 3 in a microwaveable package.

10. The product of claim 9 wherein said package is paper or paperboard.

* * * * *